US011623431B2

(12) United States Patent
Lewe et al.

(10) Patent No.: US 11,623,431 B2
(45) Date of Patent: Apr. 11, 2023

(54) COMPOSITE MATERIAL FOR A STATOR STACK AND ROTOR STACK

(71) Applicants: ThyssenKrupp Steel Europe AG, Duisburg (DE); thyssenkrupp AG, Essen (DE)

(72) Inventors: Tobias Lewe, Muenster (DE); Marco Tietz, Duesseldorf (DE); Stephan Drewes, Moenchengladbach (DE); Philipp Grunden, Duisburg (DE); Karl Telger, Coesfeld (DE); Johann Müller, Castrop-Rauxel (DE); Abdullah Kahveci, Bergkamen (DE)

(73) Assignees: ThyssenKrupp Steel Europe AG, Duisburg (DE); thyssenkrupp AG, Essen (DE)

( * ) Notice: Subject to any disclaimer, the term of this patent is extended or adjusted under 35 U.S.C. 154(b) by 363 days.

(21) Appl. No.: 16/490,175

(22) PCT Filed: Mar. 3, 2017

(86) PCT No.: PCT/EP2017/055059
§ 371 (c)(1),
(2) Date: Aug. 30, 2019

(87) PCT Pub. No.: WO2018/157943
PCT Pub. Date: Sep. 7, 2018

(65) Prior Publication Data
US 2020/0001572 A1 Jan. 2, 2020

(51) Int. Cl.
*B32B 15/01* (2006.01)
*B32B 33/00* (2006.01)
*C21D 1/70* (2006.01)
*B32B 15/082* (2006.01)
*C08F 220/18* (2006.01)

(52) U.S. Cl.
CPC ............ *B32B 15/01* (2013.01); *B32B 15/082* (2013.01); *B32B 2250/05* (2013.01); *B32B 2255/06* (2013.01); *B32B 2255/26* (2013.01); *B32B 2307/20* (2013.01); *C08F 220/1804* (2020.02); *C08F 220/1808* (2020.02)

(58) Field of Classification Search
None
See application file for complete search history.

(56) References Cited

U.S. PATENT DOCUMENTS

| 5,955,201 | A | * | 9/1999 | Loudermilk | ......... | C21D 8/1283 |
| | | | | | | 428/450 |
| 6,499,209 | B1 | | 12/2002 | Landin et al. | | |
| 2005/0048121 | A1 | * | 3/2005 | East | ........................ | A61L 27/54 |
| | | | | | | 528/274 |
| 2014/0004380 | A1 | | 1/2014 | Holzapfel et al. | | |
| 2018/0047998 | A1 | | 2/2018 | Girardon et al. | | |

FOREIGN PATENT DOCUMENTS

| CN | 104247586 A | 12/2014 |
| CN | 105131750 A | 12/2015 |
| CN | 105566970 A | 5/2016 |
| EP | 0305966 A1 | 3/1989 |
| EP | 1441044 B1 | 11/2017 |
| JP | 2001321850 A | 11/2001 |
| JP | 200938915 A | 2/2009 |
| JP | 201496429 A | 5/2014 |
| JP | 201692428 A | 5/2016 |
| JP | 201711863 A | 1/2017 |
| WO | 2009101129 A2 | 8/2009 |

OTHER PUBLICATIONS

British Standards Institution, Magnetic materials—Part 2: Methods of measurement of the magnetic properties of electrical steel strip and sheet by means of an Epstein frame, BS EN 60404-2: 1998+A1: 2008, Incorporating corrigendum Oct. 2018, BSI Standards Limited, London, United Kingdom.
European Committee for Standardization, Adhesives—Peel test for a flexible-bonded-to-rigid test specimen assembly—Part 2: 180 degree peel (ISO 8510-2:2006), Dec. 2010, CEN, Brussels.
European Committee for Standardization, Determination of dynamic mechanical properties of plastics, Flexural vibration—Resonance-curve method (ISO6721-3: 1994 + Corr 1: 1995), Dec. 1996, CEN, Brussels.
"Power transformers—Part 10: Determination of sound levels", British Standards Institution, Sep. 2001, pp. 1-39, BSI Publications, London, United Kingdom.

* cited by examiner

*Primary Examiner* — Sheeba Ahmed
(74) *Attorney, Agent, or Firm* — The Webb Law Firm

(57) ABSTRACT

A composite material, especially for use in a stator stack and/or rotor stack is disclosed. The composite material includes a first and a second electrical steel strip layer and a polymeric layer arranged in between, wherein the polymeric layer consists of a crosslinked acrylate-based copolymer of high molecular weight and has a layer thickness in the range from 3 to 20 μm.

14 Claims, 4 Drawing Sheets

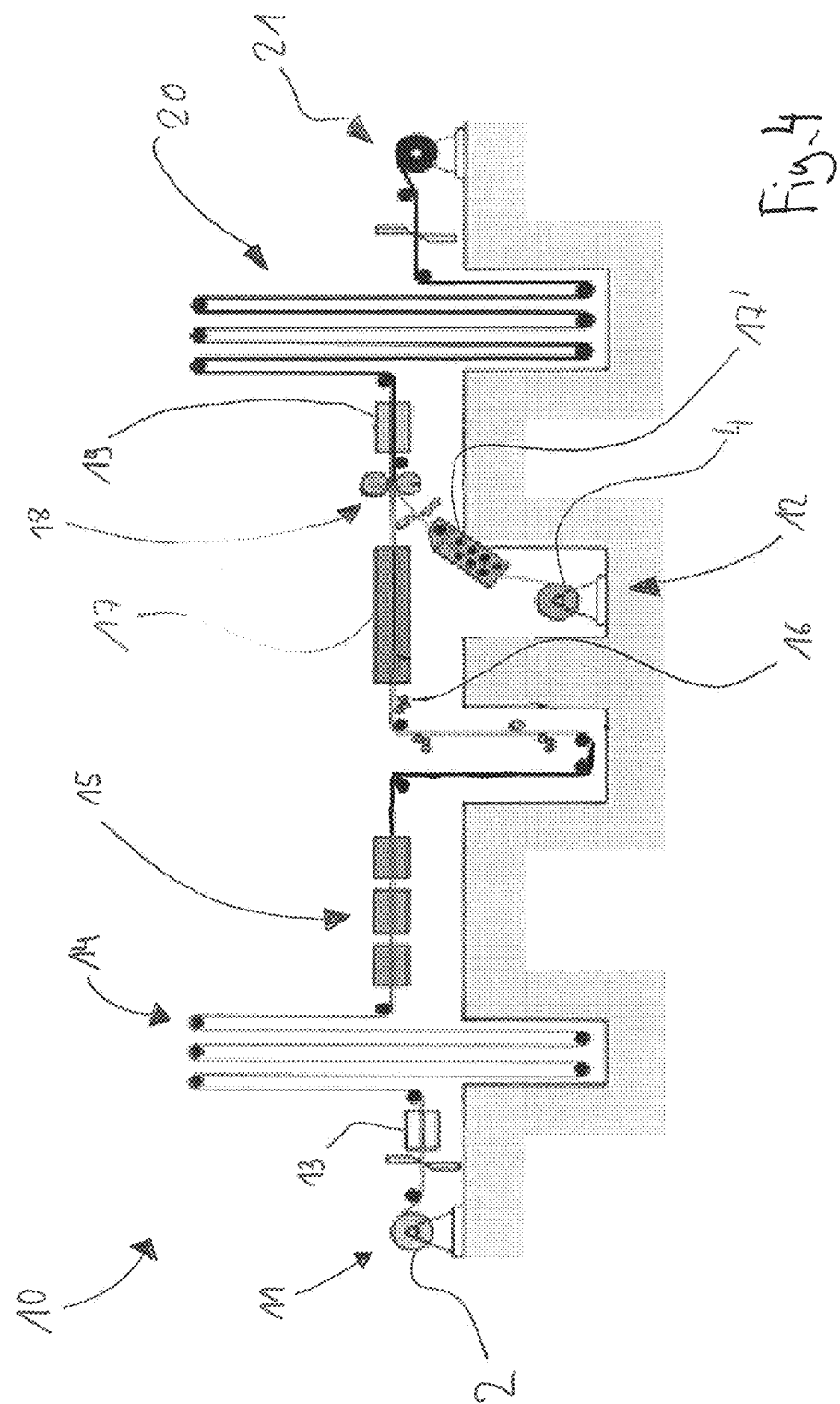

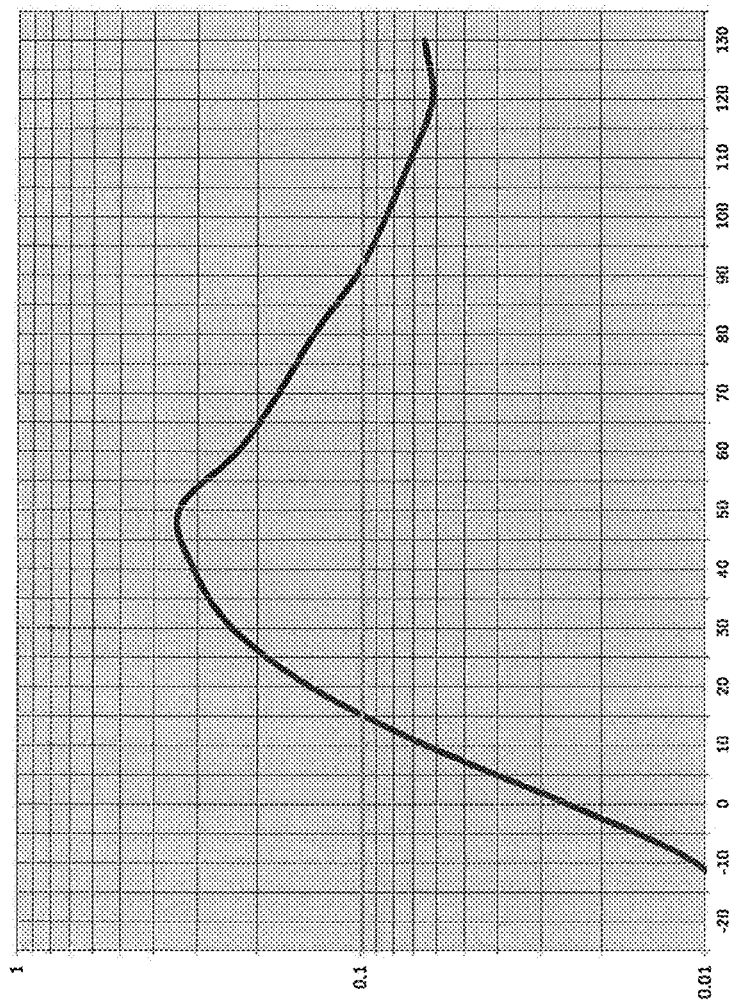

COMPOSITE MATERIAL FOR A STATOR STACK AND ROTOR STACK

CROSS-REFERENCE TO RELATED APPLICATION

This application is the United States national phase of International Application No. PCT/EP2017/055059 filed Mar. 3, 2017, the disclosure of which is hereby incorporated by reference in its entirety.

FIELD OF THE INVENTION

The present invention relates to a composite material, especially for use in a stator stack and/or rotor stack, and to a process for producing the composite material of the invention. In a further aspect, the present invention relates to a stator stack and rotor stack and to a process for producing a stator stack and/or rotor stack. The present invention further relates to an electric motor and a generator.

DESCRIPTION OF RELATED ART

The quality of the interior of cars is becoming ever more important. As well as the smell, feel and look, the soundscape is a further important constituent of a modern interior design. Especially in the case of electrically driven cars (E cars), owing to the range problem, it is still necessary to make compromises in the choice of means of reducing noise nuisance, but these are at the expense of quality.

According to the current prior art, noise nuisance is being reduced by using various secondary acoustic measures. Probably the most commonly used means are insulation mats. Further means of reducing noise nuisance that are known from the prior art are structure-borne noise-damping composite sheets from which corresponding bodywork parts are manufactured.

The use of such structure-borne noise-damping composite sheets in electric motors for uses including reduction of noise nuisance is also known from the prior art. For example, U.S. Pat. No. 6,499,209 B1 discloses a stator stack and rotor stack produced from a multitude of composite sheets. The individual composite sheets consist here of two outer magnetic layers and an about 25 μm-thick viscoelastic film based on a crosslinked acrylic polymer arranged in between.

A further composite sheet known from the prior art is known by the Bondal® CPT brand name. The composite sheet consists of two outer simple steel sheets; these do not have defined soft-magnetic properties, and a 40 μm-thick polymeric layer arranged in between.

Although such systems show the required acoustic properties and adhesion values that are suitable on account of the correspondingly large layer thicknesses, the known systems still do not have magnetic properties sufficient for use in a stator stack and/or rotor stack and iron fill factors achievable using these in a stator stack and/or rotor stack. There is therefore further potential for development of these composite sheets.

SUMMARY OF THE INVENTION

It is an object of the invention to provide a composite material improved over the prior art, especially a composite material for a stator stack and/or rotor stack having comparable properties to a monolithic electrical steel strip.

According to the invention, the composite material, especially for use in a stator stack and/or rotor stack, comprises a first and a second electrical steel strip layer, and a polymeric layer arranged in between, where the polymeric layer consists of a crosslinked acrylate-based copolymer of high molecular weight and has a layer thickness in the range from 3 to 20 μm.

It has been found that, surprisingly, the composite material of the invention, by comparison with composite materials known from the prior art, has defined soft-magnetic properties within the range of monolithic electrical steel strip sheets.

The composite material preferably has a loss at P1.0; 50 Hz in the range from 0.7 to 7 W/kg and at P1.5; 50 Hz in the range from 1.9 to 15 W/kg and/or a field strength at J2500 in the range from 1.49 to 1.7 T and at J5000 in the range from 1.6 to 1.8 T, determined to DIN EN 60404-2.

In a more preferred embodiment, the composite material has a loss at P1.0; 50 Hz in the range from 1.0 to 1.5 W/kg and at P1.5; 50 Hz in the range from 2.4 to 3.3 W/kg and/or a field strength at J2500 in the range from 1.49 to 1.57 T and at J5000 in the range from 1.60 to 1.65 T, determined to DIN EN 60404-2.

Most preferably, the composite material has a loss in the range from:
- P1.0; 50 Hz in the range from 1.3 to 1.5 W/kg and at P1.5; 50 Hz in the range from 2.8 to 3.3 W/kg and/or a field strength at J2500 in the range from 1.49 to 1.55 T and at J5000 in the range from 1.60 to 1.65 T, or
- P1.0; 50 Hz in the range from 1.35 to 1.5 W/kg and at P1.5; 50 Hz in the range from 3.0 to 3.3 W/kg and/or a field strength at J2500 in the range from 1.49 to 1.57 T and at J5000 in the range from 1.60 to 1.65 T, or
- P1.0; 50 Hz in the range from 1.0 to 1.1 W/kg and at P1.5; 50 Hz in the range from 2.4 to 2.8 W/kg and/or a field strength at J2500 in the range from 1.52 to 1.54 T and at J5000 in the range from 1.61 to 1.63 T, determined to DIN EN 60404-2.

It has additionally been found that, surprisingly, the composite material of the invention has a comparable iron fill factor in the field of use of a stator stack and/or rotor stack.

The iron fill factor in a stator stack and/or rotor stack using the composite material of the invention is preferably 96.0% to 99.0%, more preferably 97.8% to 99.0%, even more preferably 98.3 to 98.9 and most preferably 98.5% to 98.8%.

By virtue of the use of the composite material of the invention, it is possible not just to actively significantly reduce the structure-borne sound that arises in the electric motor, but additionally to generate either a further cost advantage and/or increased efficiency by, for example, variation of the electrical steel strip sheet thicknesses used.

By virtue of the polymeric layer consisting of a crosslinked acrylate-based copolymer of high molecular weight, it is possible to absorb the vibrations and/or oscillations in an improved manner and convert them to thermal energy. This achieves a significant reduction in natural motor vibration (structure-borne sound), such that the use of secondary acoustic measures can be distinctly reduced or even entirely eliminated. This leads to a weight advantage over conventional electric motors and hence to an increase in the range of electric cars.

The transmagnetization losses of electrical steel strip sheets depend very significantly on the thicknesses or on the cross section of the sheets used. In general, the smaller the layer thickness of the electrical steel strip, the smaller the loss. The use of the composite sheet of the invention—by comparison with a monolithic electrical steel strip having a thickness of, for example, 0.5 mm—makes it possible to bond two electrical steel strips of the same quality having a thickness of 0.25 mm to one another. Based on one motor type, it is thus possible to significantly increase the efficiency of the motor or enable the building of a smaller motor with the same efficiency. The latter would bring a weight advantage. Moreover, the use of an electrical steel strip of lower quality is also possible. In this way it is possible to produce a motor having the same efficiency which is producible at lower cost compared to the above motor type.

In practice, the composite materials themselves and the components produced therefrom come into contact to some degree with different oils, some of them very aggressive, that can attack the polymeric layer and hence lead to delamination. It is therefore desirable that the polymeric layer is stable to such technical oils. It has thus been found that, when the crosslinked acrylate-based copolymer of high molecular weight is composed preferably of a copolymerized mixture of at least one alkyl acrylate ester monomer unit and/or alkyl methacrylate ester monomer unit, where each has an alkyl group having 1 to 12 carbon atoms, a glycidyl monomer unit, an unsaturated carboxylic acid monomer unit, and a crosslinker, no swelling of the polymeric layer or delamination of the composite material is apparent.

In a more preferred embodiment, the crosslinked acrylate-based copolymer of high molecular weight is composed exclusively of the two components: the copolymerized mixture and the crosslinker.

In a further-preferred embodiment, the copolymerized mixture consists of at least one alkyl acrylate ester monomer unit and/or alkyl methacrylate ester monomer unit, where each has an alkyl group having 1 to 12 carbon atoms, a glycidyl monomer unit and an unsaturated carboxylic acid monomer unit.

Preferably, the glycidyl monomer unit is selected from the group consisting of allyl glycidyl ether, glycidyl acrylate ester, glycidyl methacrylate ester and/or mixtures thereof.

The alkyl acrylate ester monomer unit and/or alkyl methacrylate ester monomer unit preferably has an alkyl group having 4 to 12 carbon atoms.

If the polymeric layer has a glass transition temperature of higher than −15° C., in a preferred embodiment, an alkyl acrylate ester monomer unit and/or alkyl methacrylate ester monomer unit having an alkyl group having 1 to 4 carbon atoms may be added to the mixture to be copolymerized.

In a preferred embodiment, the crosslinked acrylate-based copolymer of high molecular weight is composed of a copolymerized mixture of at least 55% to 85% by weight of an alkyl acrylate ester monomer unit and/or alkyl methacrylate ester monomer unit, where each has an alkyl group having 4 to 12 carbon atoms, 0% to 35% by weight of an alkyl acrylate ester monomer unit and/or alkyl methacrylate ester monomer unit, where each has an alkyl group having 1 to 4 carbon atoms, 0.01% to 2% by weight of a glycidyl monomer unit, 1% to 15% by weight, more preferably 3% to 13% by weight, of an unsaturated carboxylic acid monomer unit, and 0.05% to 1% by weight of a crosslinker.

Preferably, the copolymerized mixture has an average molar mass in the range from 500 to 1500 kDa, more preferably 600 to 1000 kDa, even more preferably 700 to 900 kDa, most preferably 800 kDa±20 kDa. The average molar mass is ascertained here by means of GPC. Polystyrene standard was used for calibration.

Preferably, the alkyl acrylate ester monomer unit and/or alkyl methacrylate ester monomer unit having an alkyl group having 4 to 12 carbon atoms is selected from 2-ethylhexyl acrylate, isooctyl acrylate, butyl acrylate, 2-methylbutyl acrylate, 4-methyl-2-pentyl acrylate, isodecyl methacrylate, methyl acrylate, ethyl acrylate, methyl methacrylate and/or a mixture thereof.

Preferably, the unsaturated carboxylic acid monomer unit is selected from acrylic acid, methacrylic acid, fumaric acid and/or a mixture thereof. Preferred mixtures are composed of acrylic acid and methacrylic acid, of acrylic acid and fumaric acid or of methacrylic acid and fumaric acid.

In a preferred embodiment, the copolymerization is conducted with the aid of a solvent mixture, preferably a mixture of ethyl acetate and acetone. The solvent mixture preferably has a ratio that permits reflux within the range from 68 to 78° C.

The solids content during the copolymerization is preferably in the range from 40 to 60% by weight.

Preference is given to using AIBN as free-radical initiator for the copolymerization.

In addition, the copolymerization is preferably conducted under a nitrogen atmosphere, such that a copolymer of high molecular weight, preferably having an average molar mass of ≥500 kDa, is achieved.

The crosslinker is preferably selected from aluminum acetylacetonate (AlACA), iron acetylacetonate (FeACA), titanium acetylacetonate (TiACA) or zirconium acetylacetonate (ZrACA).

In a further preferred embodiment, the electrical steel strip layer has a layer thickness in the range from 50 to 1500 μm, more preferably in the range from 50 to 1000 μm, even more preferably in the range from 50 to 750 μm and most preferably in the range from 50 to 650 μm.

The composite material of the invention can be produced using two electrical steel strip layers of equal thickness or different thickness.

The electrical steel strip is preferably a grain-oriented or non-grain-oriented electrical steel strip. A grain-oriented electrical steel strip is used in the building of transformers; a non-grain-oriented steel strip is used in the building of electric motors and generators.

In order to prevent short-circuits between two electrical steel strips, the electrical steel strip layers, in a preferred configuration, are provided with an insulation layer in order to achieve electrical shielding. The electrical steel strip layer preferably has an insulation layer having a layer thickness in the range from 0.5 to 5 μm, more preferably 1 to 1.5 μm.

The insulation layer may consist of an organic polymer, for example an acrylate resin, alkyd resin, epoxy resin, melamine resin, phenolic resin, polyamide resin, polyester resin and polyurethane resin or a mixture thereof. In another preferred variant, the organic polymer may contain further inorganic components, for example aluminum phosphate, pigments and/or fillers, for example titanium dioxide, barium sulfate, calcium carbonate (kaolin), silicon dioxide or zinc sulfide.

In a particularly preferred execution variant, the insulation layer consists of a thermally activatable adhesive.

In another preferred embodiment, the polymeric layer has a layer thickness in the range from 3 to 10 μm, more preferably 4 to 8 μm, most preferably in the range from 4.5 to 7.5 μm.

In a further aspect, the present invention relates to a process for continuously producing a composite sheet, comprising the process steps of:

providing a first electrical steel strip layer, coating the first electrical steel strip layer with a polymeric composition consisting of an acrylate-based copolymer of high molecular weight and a crosslinker, heating the coated first electrical steel strip layer, providing and heating a second electrical steel strip layer, and laminating the two electrical steel strip layers, so as to obtain a composite material having a polymeric layer consisting of a crosslinked acrylate-based copolymer of high molecular weight having a layer thickness in the range from 3 to 20 µm.

The first electrical steel strip and also the second electrical steel strip is preferably provided as a coil, and so a continuous process for producing the composite material of the invention can be implemented.

The first electrical steel strip is preferably coated by means of a coater. In this way, a homogeneous layer of the polymeric composition is applied to the first electrical steel strip layer. The application is effected in such a way that the composite material, after the laminating step, has a polymeric layer having a layer thickness in the range from 3 to 20 µm, preferably 3 to 10 µm, more preferably in the range from 4 to 8 µm and most preferably in the range from 4.5 to 7.5 µm.

In a preferred embodiment, the uncoated side of the electrical steel strip is coated with the polymeric composition.

In a further preferred embodiment, a pretreatment of the first electrical steel strip layer takes place between the step of providing the first electrical steel strip layer and the applying of the polymeric layer. The pretreatment is preferably a cleaning operation. The surface of the electrical steel strip used is freed here of adhering soil particles and oils and hence prepared for the application of the polymeric composition.

In a preferred embodiment, the acrylate-based copolymer of high molecular weight is formed by a copolymerized mixture of at least one alkyl acrylate ester monomer unit and/or alkyl methacrylate ester monomer unit, where each has an alkyl group having 1 to 12 carbon atoms, a glycidyl monomer unit, and an unsaturated carboxylic acid monomer unit.

The electrical steel strip layers are preferably heated to a temperature in the range from 150 to 250° C., more preferably in the range from 160 to 190° C., further preferably in the range from 175 to 185° C. The electrical steel strip layers can be heated by means of conventional ovens or by means of induction. Corresponding techniques are known to those skilled in the art.

The two heated electrical steel strip layers are preferably laminated by means of a laminator station. The first electrical steel strip layer to which the polymeric composition has been applied is combined here with the second electrical steel strip layer, so as to obtain the composite material of the invention.

The still-hot composite material generally passes through a cooling zone, where it is cooled down to room temperature and then wound to give a coil.

In a particularly preferred execution variant, in a next process stage, a thermally activatable adhesive is applied by means of a coil-coating method to one side, more preferably to both sides, of the composite material. This can be applied to the composite material over part of the area, more preferably over the full area.

In a further aspect, the present invention relates to a composite material produced by the process of the invention.

A composite material produced in this way with, by comparison to composite materials known from the prior art, preferably has soft-magnetic properties within the range of monolithic electrical steel strip sheets.

The composite material preferably has a loss at P1.0; 50 Hz in the range from 0.7 to 7 W/kg and at P1.5; 50 Hz in the range from 1.9 to 15 W/kg and/or a field strength at J2500 in the range from 1.49 to 1.7 T and at J5000 in the range from 1.6 to 1.8 T, determined to DIN EN 60404-2.

In a more preferred embodiment, the composite material has a loss at P1.0; 50 Hz in the range from 1.0 to 1.5 W/kg and at P1.5; 50 Hz in the range from 2.4 to 3.3 W/kg and/or a field strength at J2500 in the range from 1.49 to 1.57 T and at J5000 in the range from 1.60 to 1.65 T, determined to DIN EN 60404-2.

Most preferably, the composite material has a loss in the range from:

P1.0; 50 Hz in the range from 1.3 to 1.5 W/kg and at P1.5; 50 Hz in the range from 2.8 to 3.3 W/kg and/or a field strength at J2500 in the range from 1.49 to 1.55 T and at J5000 in the range from 1.60 to 1.65 T, or P1.0; 50 Hz in the range from 1.35 to 1.5 W/kg and at P1.5; 50 Hz in the range from 3.0 to 3.3 W/kg and/or a field strength at J2500 in the range from 1.49 to 1.57 T and at J5000 in the range from 1.60 to 1.65 T, or P1.0; 50 Hz in the range from 1.0 to 1.1 W/kg and at P1.5; 50 Hz in the range from 2.4 to 2.8 W/kg and/or a field strength at J2500 in the range from 1.52 to 1.54 T and at J5000 in the range from 1.61 to 1.63 T, determined to DIN EN 60404-2.

In a further aspect, the present invention relates to a stator stack comprising a multitude of layers of the composite material of the invention.

In a further aspect, the present invention relates to a rotor stack comprising a multitude of layers of the composite material of the invention.

The stator stack and/or rotor stack of the invention may preferably have a homogeneous or heterogeneous construction. A homogeneous construction consists of a multitude of layers of the composite material of the invention. A heterogeneous construction consists of a multitude of layers of the composite material of the invention and monolithic electrical steel strip layers arranged in between. For example, the construction may have an arrangement in which every third layer consists of a monolithic electrical steel strip.

In a further aspect, the present invention relates to an electric motor comprising a stator stack and/or rotor stack of the invention.

In a further aspect, the present invention relates to a generator comprising a stator stack and/or rotor stack of the invention.

A further aspect of the present invention further relates to a process for producing a stator stack and/or rotor stack, comprising the steps of:

providing a composite material of the invention, separating a multitude of lamellae from the composite material, and bonding the lamellae to form a stator stack and/or rotor stack.

The separating of the lamellae from the composite material, preferably in the form of a coil, can be effected, for example, by means of a suitable stamping or cutting tool. The lamellae separated are then stacked to give a stack and bonded to one another.

By virtue of a composite material preferably in the form of a coil already being provided, a process advantage arises in the separation compared to the production of the stator stack and/or rotor stack using a monolithic electrical steel strip sheet since only half the separation layers are required for provision of a stator stack and/or rotor stack having the same thickness.

The bonding of the lamellae is preferably effected by means of packetizing; this produces a mechanical bond between the individual lamellae. This bond is formed by elevations that are punched into the individual lamellae.

In a more preferred execution variant, the individual lamellae are bonded to one another. Preference is given to using a thermally activatable adhesive for the bonding. The bonding with the thermally activatable adhesive can be effected over part of the area, more preferably over the full area. This may be activated before, during or after the stacking of the lamellae. The thermally activatable adhesive can thus be activated over the different process steps and hence converted to a tacky state, so as to give separation in time and/or space.

Alternatively, it is also possible to use what is called a baking enamel or an adhesive bond in the form of dots for bonding of the lamellae.

In a further aspect, the present invention relates to the use of the composite material of the invention for production of a stator and/or a rotor for an electric motor and/or a generator.

The invention is elucidated in detail hereinafter by examples.

EXAMPLES

First of all, a polymeric composition consisting of an acrylate-based copolymer of high molecular weight and a crosslinker was produced.

For this purpose, a monomer solution composed of 207 g of butyl acrylate, 61.2 g of 2-ethylhexyl acrylate, 23.1 g of acrylic acid and 0.1 g of 2,3-epoxypropyl methacrylate was prepared. Then 68.5 g were taken from the monomer solution and introduced into a 1.5 liter reactor that was purged with nitrogen. The reactor was equipped with a stirrer unit, a reflux condenser and a thermistor. Subsequently, 29.7 g of ethyl acetate and 18 g of acetone were added to the monomer solution. The solution was heated under reflux. Then 0.05 g of AIBN (DuPont) was dissolved in 4.5 g of ethyl acetate and added to the solution boiling under reflux. The solution was then kept under vigorous reflux for 15 minutes. The remaining monomer solution was mixed with 195 g of ethyl acetate, 40 g of acetone and 0.24 g of AIBN and added constantly as a solution to the solution boiling under reflux in the reactor over the course of 3 hours. After the addition had ended, the solution was kept under reflux for an additional hour. Subsequently, a solution of 0.12 g of AIBN, 9 g of ethyl acetate and 4 g of acetone was added to the reactor and the solution was kept under reflux for a further hour. This operation was repeated twice more. After the addition had ended, the solution was kept under reflux for a further hour. Subsequently, 178 g of toluene and 27 g of n-heptane were. The crude product obtained had a solids content of 36% by weight and a viscosity of 8000 Pa·s. The viscosity was determined with a Brookfield viscometer (#4 spindle, 12 rpm). The copolymer obtained consisted of 71% by weight of n-butyl acetate, 21% by weight of 2-ethylhexyl acrylate, 8% by weight of acrylic acid and 0.03% by weight of 2,3-epoxypropyl methacrylate. The copolymer was then mixed with 0.1% by weight of aluminum acetylacetonate in order to obtain the polymeric composition.

Example 1

Three composite materials were produced using the polymeric composition. For this purpose, two electrical steel strips in each case of electrical steel strip types 280-30 AP (thickness 300 µm), M 330-35 A (thickness 350 µm) and M 330-50 A (thickness 500 µm), where each strip had been coated on one side with an electrical insulation varnish (Stabolit® 20) (layer thickness 1 µm), were bonded by means of a lamination method.

The corresponding electrical steel strip (DIN A4 format) was coated with the polymeric composition on the uncoated side by means of a laboratory coater. The polymeric composition was applied in an amount corresponding to a layer thickness of 6 µm±1 µm in the finished composite material. Subsequently, the respective sample was predried in an air circulation oven at 110° C. for 1 min in order to remove the solvent. For the lamination process, the corresponding samples have been heated to 170-190° C. in a continuous laboratory kiln (kiln time about 50 s). Immediately after attainment of the PMT (peak metal temperature), the sample was laminated under pressure (30 to 35 N/mm) in a roll mill with the second electrical steel strip sheet that had likewise been heated to 170-190° C.

The composite material obtained had a total thickness of 608 µm±1 µm, 708±1 µm or 1008 µm±1 µm.

The composite materials obtained were characterized with regard to acoustic, magnetic and adhesion properties. The table below shows the results by comparison with a corresponding monolithic electrical steel strip of the same quality and a composite material known from the prior art.

|  | 280-30 AP | M 330-35 A | M 330-50 A |
|---|---|---|---|
| | Composite material according to example 1 | | |
| Acoustic properties (500 Hz) | loss factor 0.102/test temperature 80° C. Oberst test DIN EN ISO 6721-3 | loss factor 0.112/test temperature 80° C. Oberst test DIN EN ISO 6721-3 | loss factor 0.114/test temperature 80° C. Oberst test DIN EN ISO 6721-3 |
| Magnetic properties (frequency 50 Hz/ M position) | P1.0 T - 1.07 W/kg P1.5 T - 2.46 W/kg J2500 A/m - 1548 mT J5000 A/m - 1641 mT | P1.0 T - 1.11 W/kg P1.5 T - 2.68 W/kg J2500 A/m - 1561 mT J5000 A/m - 1652 mT | P1.0 T - 1.43 W/kg P1.5 T - 3.25 W/kg J2500 A/m - 1586 mT J5000 A/m - 1676 mT |
| Adhesion (peel test) | 18 N/4 cm DIN EN ISO 8510-2 (basis) | 14 N/4 cm DIN EN ISO 8510-2 (basis) | 11 N/4 cm DIN EN ISO 8510-2 (basis) |
| | Monolithic electrical steel strip types | | |
| Acoustic properties (500 Hz) | loss factor ≥0.001/test temperature 80° C. Oberst test DIN EN ISO 6721-3 | loss factor ≥0.001/test temperature 80° C. Oberst test DIN EN ISO 6721-3 | loss factor ≥0.001/test temperature 80° C. Oberst test DIN EN ISO 6721-3 |

-continued

|  | 280-30 AP | M 330-35 A | M 330-50 A |
|---|---|---|---|
| Magnetic properties (frequency 50 Hz/ M position) | P1.0 T - 1.05 W/kg<br>P1.5 T - 2.37 W/kg<br>J2500 A/m - 1532 mT<br>J5000 A/m - 1622 mT | P1.0 T - 1.13 W/kg<br>P1.5 T - 2.58 W/kg<br>J2500 A/m - 1579 mT<br>J5000 A/m - 1666 mT | P1.0 T - 1.42 W/kg<br>P1.5 T - 3.13 W/kg<br>J2500 A/m - 1591 mT<br>J5000 A/m - 1678 mT |
| Adhesion (peel test) | — | — | — |
| Acoustic properties (500 Hz) | | Standard composite material bondal ® CPT/core layer thickness 40 μm/individual outer sheet thickness 0.6 mm loss factor 0.323/test temperature 80° C. Oberst test DIN EN ISO 6721-3 | |
| Magnetic properties | | — | |
| Adhesion (peel test) | | 142 N/4 cm DIN EN ISO 8510-2 (basis) | |

In addition, the stability of the polymeric layer was examined. For this purpose, test specimens (2.5×10 cm) that had been correspondingly cut to size from the composite materials obtained were placed into an appropriate test liquid (Shell ATF 134 FE transmission oil; Nynas Nytro Taurus transformer oil (IEC 60296) Ed. 4—Standard grade) at 120° C. for 164 h. After the stress time had elapsed, the test specimens were examined visually. It was not possible here to detect either delamination or swelling of the polymeric layer.

BRIEF DESCRIPTION OF THE DRAWINGS

The invention is elucidated in detail hereinafter by drawings. The individual drawings show.

DESCRIPTION OF THE INVENTION

Figure 1:
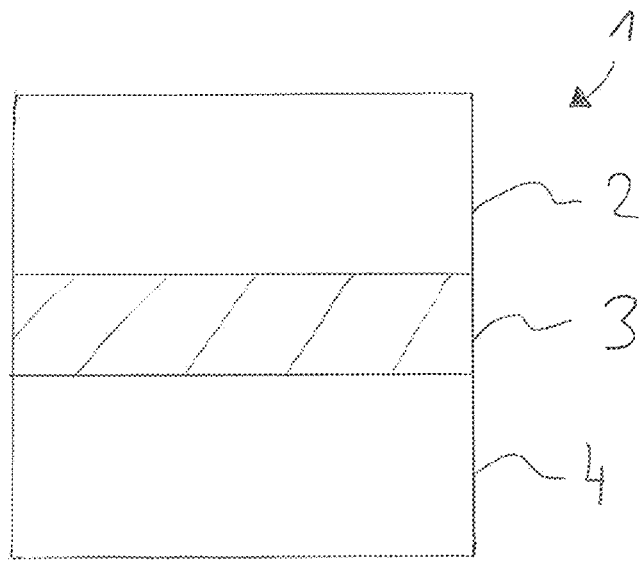
FIG. 1 is a cross-sectional view of a first execution variant of the composite material of the invention.

FIG. 1 shows a three-layer construction of an inventive composite material 1 in a first embodiment. The composite material 1 comprises a first electrical steel strip layer 2, a second electrical steel strip layer 4 and a polymeric layer 3 arranged in between.

Figure 2:
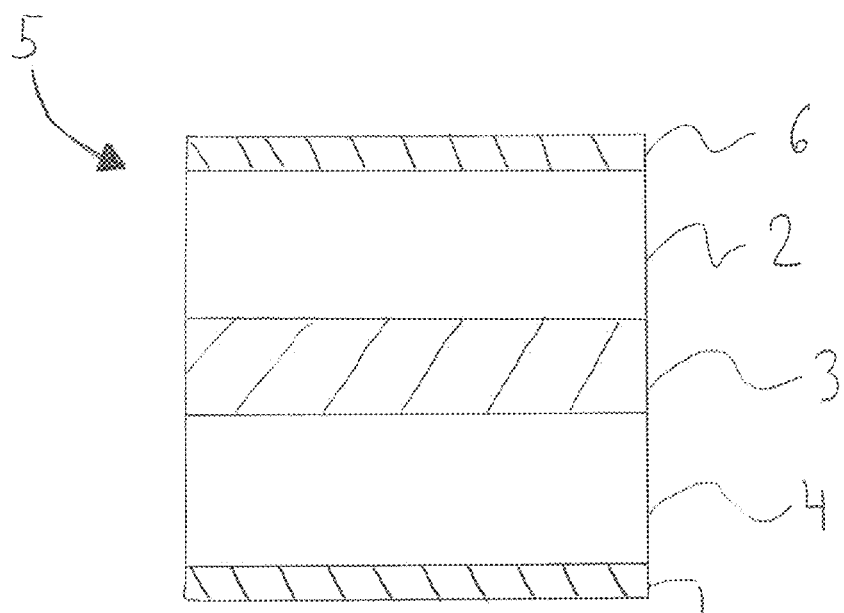
FIG. 2 is a cross-sectional view of a second execution variant of the composite material of the invention.

FIG. 2 shows a second execution variant of the inventive composite material 5 with a first and second electrical steel strip layer 2, 4 and a polymeric layer 3 arranged in between. On the opposite side from the polymeric layer 3, the two electrical steel strip layers 2, 4 each have an insulation layer 6. In a preferred execution variant, this is formed by a thermally activatable adhesive.

Figure 3:
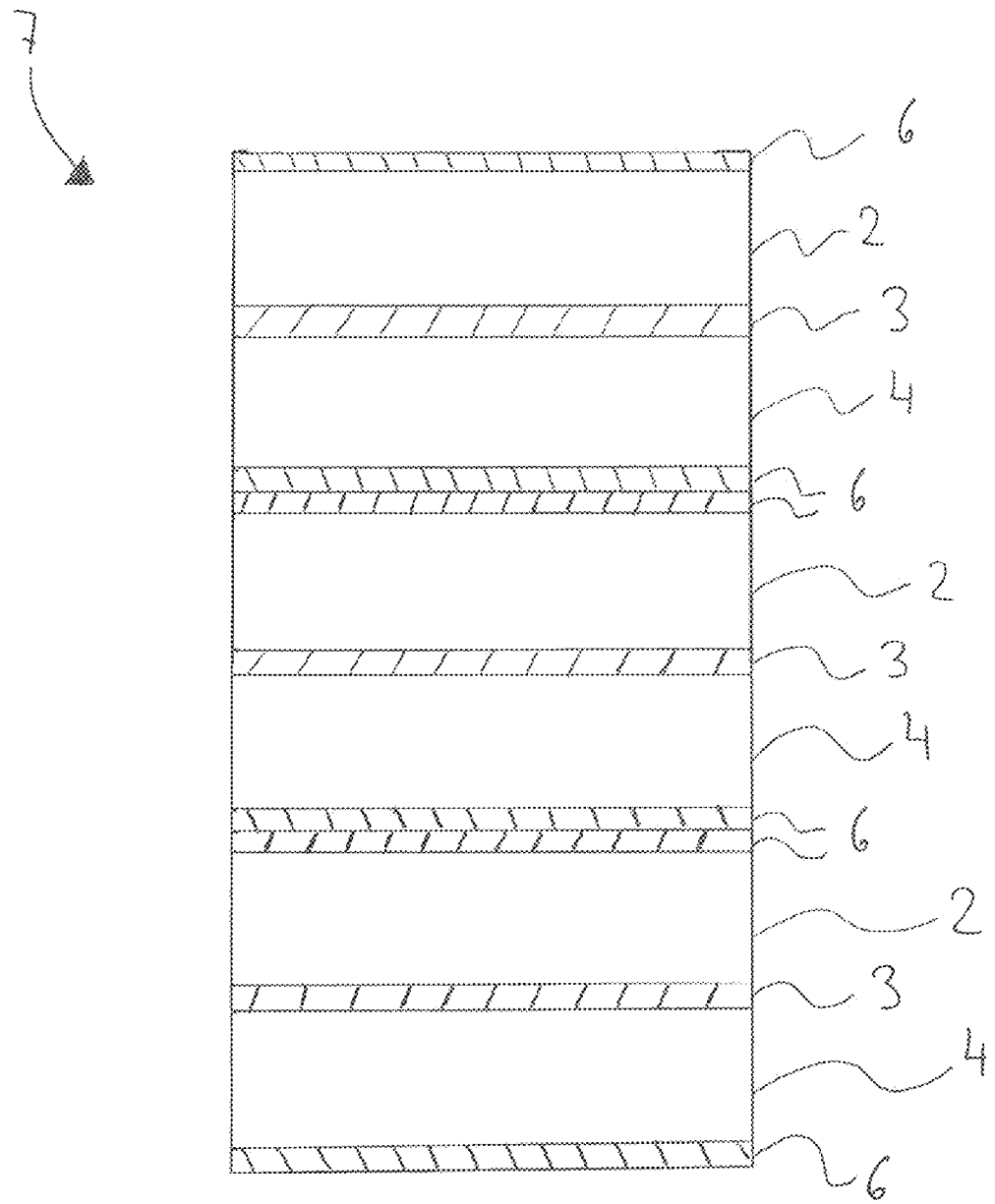
FIG. 3 is a cross-sectional view of a multilayer construction using the composite material of the second execution variant, FIG. 4 a process flow diagram for production of the composite material of the invention, and FIG. 5 a diagram of a measurement of loss factor to DIN EN ISO 6721-3 at 500 Hz for a composite material according to example 1 variant 280-30 AP.

FIG. 3 shows a multilayer construction 7 using the composite material 5 in the second execution variant. The individual layers of the composite material 5 are arranged here one on top of another to form a stack. If the insulation layer 6 is formed by a thermally activatable adhesive, the multilayer construction 7 has a homogeneous insulation layer 6 between the individual lamellae (not shown).

FIG. 4 shows a process flow diagram for continuous production of the inventive composite material 1, 5 by means of a coil-coating plant 10. The plant 10 has a first and a second coil unwinding station 11, 12, with which a first and second electrical steel strip layer 2, 4 are provided. In addition, the plant 10 has a stitching apparatus 13 and a first and second coil store 14, 20 that permit changing of a coil without having to interrupt the process. The first electrical steel strip layer 2 is optionally first sent to a pretreatment stage 15 in order to free the surface of the electrical steel strip layer 2 of adhering soil particles and oils. Subsequently, by means of an application roll 16, the polymeric composition (not shown) is applied on one side. The electrical steel strip layer 2 that has been coated with the polymeric composition then passes through a 2-zone oven 17 in which the coating applied is predried at 100-120° C. At the same time, the solvent is removed. In the second zone of the oven 17, the electrical steel strip layer 2 is heated to the PMT (170-190° C.). In addition, a second electrical steel strip layer 4 is provided from the second unwinding station 12 and first sent to a heating station 17 in which the second electrical steel strip layer 4 is likewise heated to the PMT. In a laminating station 18, the two electrical steel strip layers 2, 4 are laminated to one another under a pressure of 5 kN and at a temperature of 150-170° C. to give the composite material 1, 5. Subsequently, the still-hot composite material 1, 5 passes through a cooling station, where it is cooled down to room temperature, and then wound to a coil at a coil winding station 21.

FIG. 5 shows a diagram of a measurement of loss factor for example 1 variant 280-30 AP. The measurement was conducted in accordance with DIN EN ISO 6721-3 at 500 Hz. For this purpose, test strips (250×15 mm) were used, and a free length of 200 mm had to be present. The test strips were dressed and deburred. There was no need for adhesive bonding of a metallic platelet. It was found that the composite material has a loss factor in the range from 0.1 to 0.25 within a temperature range from 15 to 90° C. A loss factor of greater than 0.1 means that the material is a fully damped material.

LIST OF REFERENCE NUMERALS 1 composite material
2 first electrical steel strip layer
3 polymeric layer 4 second electrical steel strip layer
5 composite material
6 insulation layer
7 multilayer construction
10 coil-coating plant
11 coil unwinding station
12 coil unwinding station
13 stitching apparatus
14 coil store
15 pretreatment stage
16 application roll
17 heating station
18 laminating station
19 cooling station
20 coil store
21 coil winding station

The invention claimed is:

1. A composite material for use in a stator stack or a rotor stack, the composite material comprising:
 a first electrical steel strip layer and a second electrical steel strip layer; and
 a polymeric layer arranged in between the first electrical steel strip layer and the second electrical steel strip layer, wherein the polymeric layer consists of a cross-linked acrylate-based copolymer with an average molar mass in the range from 500 kDa to 1500 kDa and has a layer thickness in the range from 3 to 20 μm.

2. The composite material as claimed in claim 1, wherein the copolymerized mixture has an average molar mass in the range from 600 to 1000 kDa.

3. The composite material as claimed in claim 1, wherein the first electrical steel strip layer and the second electrical steel strip layer have a layer thickness in the range from 50 to 1500 μm.

4. The composite material as claimed in claim 1, wherein the first electrical steel strip layer and the second electrical steel strip layer have an insulation layer having a layer thickness in the range from 0.5 to 2 μm.

5. A method for continuously producing a composite material, the method comprising the steps of:
 providing a first electrical steel strip layer;
 coating the first electrical steel strip layer with a polymeric composition consisting of an acrylate-based copolymer with an average molar mass in the range from 500 kDa to 1500 kDa and a crosslinker;
 heating the coated first electrical steel strip layer;
 providing and heating a second electrical steel strip layer; and
 laminating the first and the second electrical steel strip layers, so as to obtain a composite material having a polymeric layer consisting of a crosslinked acrylate-based copolymer having a layer thickness in the range from 3 to 20 μm.

6. The method as claimed in claim 5, wherein the first and the second electrical steel strip layers are heated to a temperature in the range from 150 to 250° C.

7. A composite material produced by the method as claimed in claim 5.

8. The composite material as claimed in claim 7, having a loss at P1.0; 50 Hz in the range from 0.7 to 7 W/kg and at P1.5; 50 Hz in the range from 1.9 to 15 W/kg and/or a field strength at J2500 in the range from 1.49 to 1.7 T and at J5000 in the range from 1.6 to 1.8 T, determined to DIN EN 60404-2.

9. A stator stack or a rotor stack comprising a plurality of layers of the composite material as claimed in claim 1.

10. A process for producing a stator stack or a rotor stack, comprising the steps of:
 providing a composite material, comprising:
 a first electrical steel strip layer and a second electrical steel strip layer; and
 a polymeric layer arranged in between the first electrical steel strip layer and the second electrical steel strip layer, wherein the polymeric layer consists of a cross-linked acrylate-based copolymer with an average molar mass in the range from 500 kDa to 1500 kDa and has a layer thickness in the range from 3 to 20 μm
 separating a plurality of lamellae from the composite material; and
 bonding the lamellae to form the stator stack or the rotor stack.

11. The composite material as claimed in claim 1, wherein the polymeric layer absorbs vibrations and/or oscillations and converts the vibrations and/or oscillations to thermal energy to reduce structure-borne sound.

12. The composite material as claimed in claim 1, wherein the crosslinked acrylate-based copolymer comprises:
 a copolymerized mixture of at least one of an alkyl acrylate ester monomer unit and/or alkyl methacrylate ester monomer unit, wherein each unit has an alkyl group having 1 to 12 carbon atoms,
 a glycidyl monomer unit;
 an unsaturated carboxylic acid monomer unit; and
 a crosslinker.

13. The method as claimed in claim 5, wherein the acrylate-based copolymer comprises:
 a copolymerized mixture of at least one of an alkyl acrylate ester monomer unit and/or alkyl methacrylate ester monomer unit, wherein each unit has an alkyl group having 1 to 12 carbon atoms,
 a glycidyl monomer unit; and
 an unsaturated carboxylic acid monomer unit.

14. The process as claimed in claim 10, wherein the crosslinked acrylate-based copolymer comprises:
 a copolymerized mixture of at least one of an alkyl acrylate ester monomer unit and/or alkyl methacrylate ester monomer unit, wherein each unit has an alkyl group having 1 to 12 carbon atoms,
 a glycidyl monomer unit;
 an unsaturated carboxylic acid monomer unit; and
 a crosslinker.

* * * * *